Sept. 17, 1957 J. R. CONLIN ET AL 2,806,932
VAPORIZER
Filed March 2, 1955 2 Sheets-Sheet 2
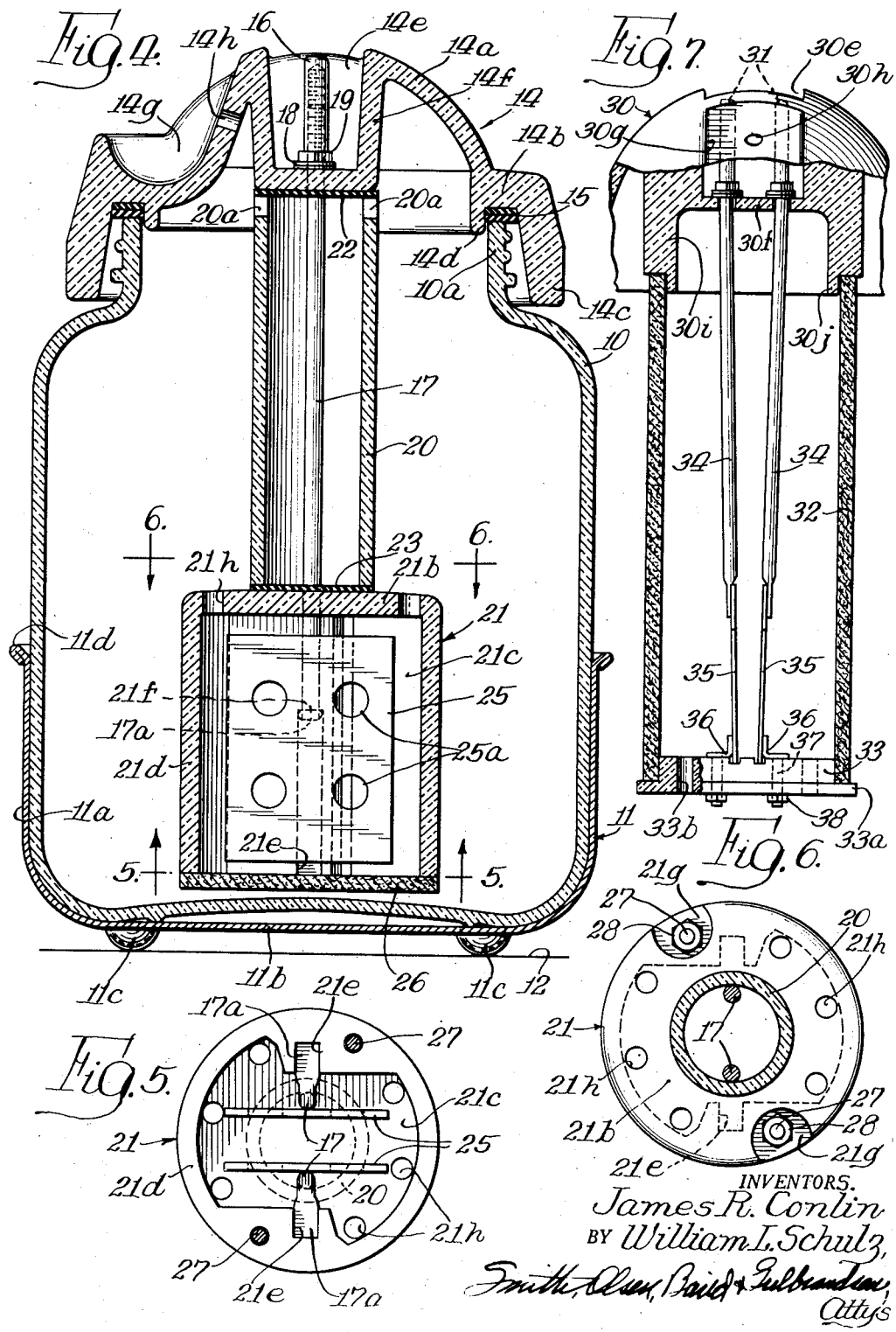
INVENTORS.
James R. Conlin
BY William L. Schulz
Smith, Olsen, Baird & Gulbrandsen
Attys

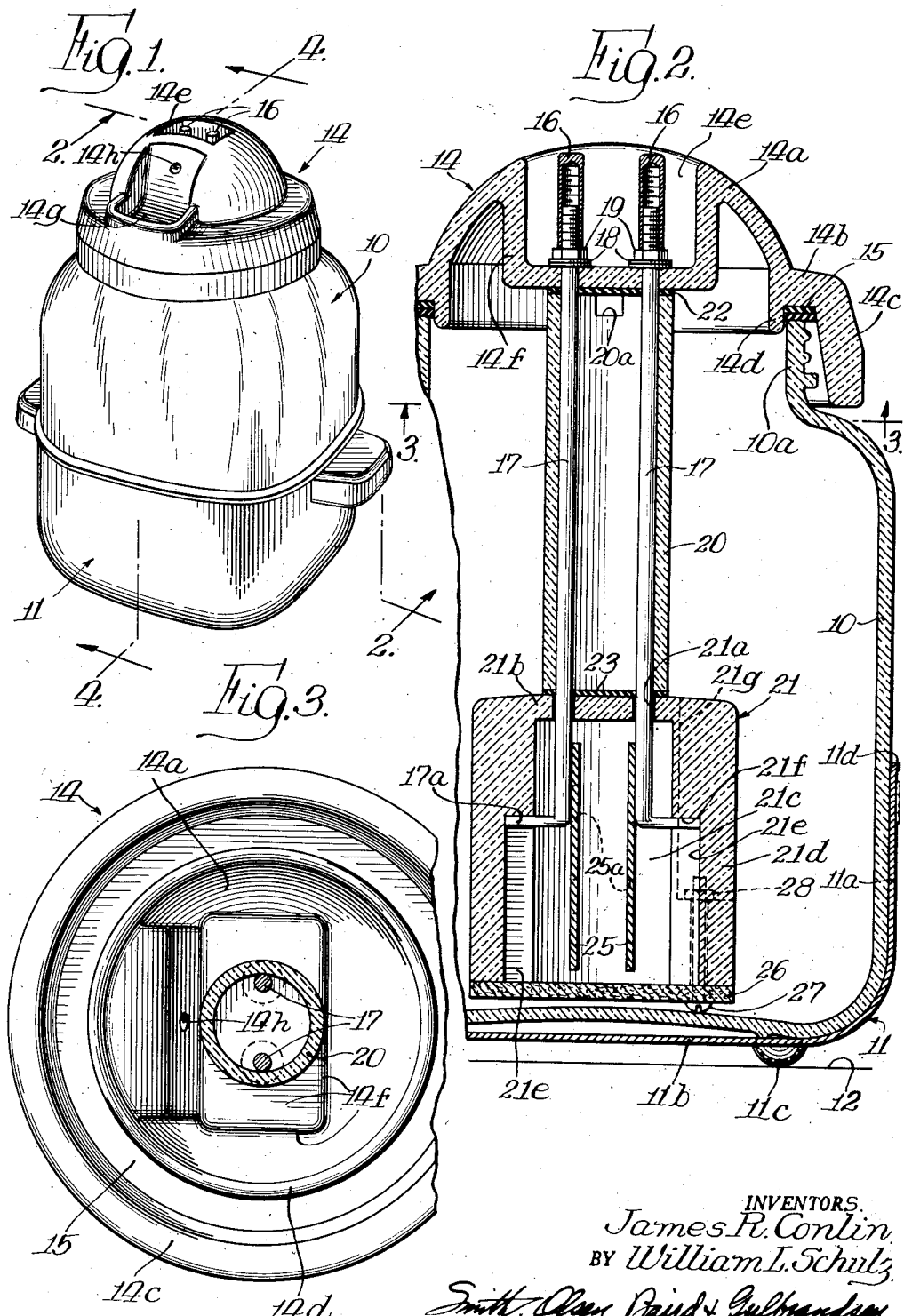

United States Patent Office 2,806,932
Patented Sept. 17, 1957

2,806,932

VAPORIZER

James R. Conlin and William L. Schulz, Reedsburg, Wis., assignors to Hankscraft Company, Reedsburg, Wis., a corporation Application March 2, 1955, Serial No. 491,687

6 Claims. (Cl. 219—40)

This invention relates to improvements in vaporizers and its purpose is to provide a simple device which may be readily constructed at a relatively small cost and which may be conveniently and economically operated.

The improvements of the present invention are preferably embodied in a vaporizer of the liquid conductor heater type wherein a measured quantity of water in a vessel is heated and vaporized by the passage of electric current therethrough between spaced electrodes, whereby the device has a definite time period of operation which is terminated by the complete evaporation of the water. The invention is particularly adapted for the production of a controlled supply of steam or vapor, to which a quantity of a medicament may be added, for the treatment of colds, bronchial ailments and other nasal and respiratory disorders.

The principal object of the invention is to provide an improved vaporizer comprising a novel spaced electrode unit which is conveniently employed with a standard jar or water containing vessel. Another object is to provide a vaporizer comprising a vessel having a detachable cap carrying spaced electrodes which are mounted in a tubular structure carried by the cap and adapted to enclose a limited quantity of water which will be quickly vaporized independently of the main body of water in the vessel. A further object of the invention is to provide a vaporizer comprising a cap adapted to close a water containing vessel and having suspended therefrom a novel tubular structure which encloses spaced electrodes and which is provided with means for permitting the entrance of water from the vessel and for the escape of steam. Other objects relate to various features of construction and arrangement which will appear more fully hereinafter.

The nature of the invention will be understood from the following specification taken with the accompanying drawings in which one embodiment of the invention and a modification thereof are illustrated. In the drawings, Figure 1 is a perspective view of a vaporizer embodying the present invention;

Fig. 2 is a partial enlarged vertical section taken on the line 2—2 of Fig. 1;

Fig. 3 shows a horizontal section taken on the line 3—3 of Fig. 2, looking in the direction of the arrows;

Fig. 4 shows a vertical section taken on the line 4—4 of Fig. 1;

Fig. 5 shows a horizontal section taken on the line 5—5 of Fig. 4, looking in the direction of the arrows;

Fig. 6 shows a horizontal section taken on the line 6—6 of Fig. 4, looking in the direction of the arrows; and Fig. 7 shows a partial vertical section, similar to that of Fig. 2, showing a modified form of a portion of the improved vaporizer.

As shown in the drawings, the invention comprises a vessel 10 adapted to contain a substantial quantity of water, for example, from one-half gallon to one gallon. This vessel is formed preferably of glass or the like and may be an ordinary commercial glass jar having a substantially square horizontal cross-section with rounded corners and having an inwardly sloping top portion which is united with a circular neck or flange 10a having a screw-threaded exterior adapted to be united with the usual cover or cap when the jar is not being used as a part of the vaporizer. This vessel 10 is seated within a cup-shaped metal shell or base 11, formed preferably of aluminum, which has an outer annular wall 11a, adapted to fit over the lower portion of the outer wall of the vessel 10, and a bottom wall 11b provided with a series of downwardly extending lugs or projections 11c which are adapted to rest upon the table or other support 12. The table 12 is thus protected against damage from the heat of the bottom wall of the vessel due to the spacing of the base 11 above its top surface. The top edge of the base or shell 11 is flared outwardly as shown at 11d so that any water which escapes from the top of the vaporizer and runs down the side of the vessel 10 will be trapped by the shell 11 and eventually find its way to the space between the bottom 11b of the shell and the bottom of the vessel. To facilitate this action the shell or base 11 does not tightly fit the vessel 11 throughout its periphery although the fit is close enough at some places, such as the corners, to maintain the vessel 10 and the shell 11 normally in assembled relationship by frictional contact. The external surface of the shell 11 is preferably plated with nickel or chromium.

The vessel 10 is closed when in use by a cap 14 formed of insulating material, such as a molded phenolic plastic, and arranged to support the spaced electrodes within the vessel. This cap has a dome-shaped middle portion 14a from which an annular flange 14b extends horizontally outward to unite with the annular depending flange or skirt 14c adapted to extend downwardly around the neck 10a. An inner circular flange 14d extends downwardly from the inner margin of the flange 14b in spaced relation to the flange or skirt 14c thus forming a groove in which two rubber washers 15 are held by frictional contact. These washers are adapted to form a substantially fluid tight connection between the cap and the neck 10a upon which they rest.

The dome shaped portion 14a of the cap is provided with a centrally located recess 14e of rectangular horizontal cross section bounded by integral walls 14f. This recess or cavity 14e has mounted therein two terminal posts 16 which are adapted to enter the sockets in the end of the usual terminal plug connected to the end of a flexible cord by which a connection is established with an alternating current circuit such as that of the usual household lighting system. The plug is adapted to enter the recess 14e so that no parts of the electric circuit are exposed.

The dome shaped portion 14a of the cap 14 is further provided at one side with a cavity 14g which extends outwardly into the flange 14b and which forms a receptacle for a medicament. The inner wall of the cavity is provided with a port 14h, located above the level of the medicament, through which the steam or vapor generated in the vessel 10 is discharged in an upwardly inclined direction over the medicament so that the vapors of the medicament are entrained by the steam to form a mixture which is then inhaled by the patient.

The terminal posts 16 are hollow in their lower parts and are internally threaded for engagement by the upper threaded extremities of two circular terminal rods 17 which extend through apertures in the lower wall 14f of the cavity 14e with their threaded portions engaged by washers 18 and nuts 19. These rods extend downwardly in parallel relationship from the bottom wall 14f within a cylindrical insulating tube 20 which may be formed of asbestos, porcelain or the like, and which is provided at its upper end with two oppositely directed ports 20a. The two rods contact diametrically opposite portions of the inner surface of the tube and extend from the bottom of this tube through apertures 21a formed in the top wall 21b of a hollow vaporizing head 21 in which the electrodes are mounted. The head 21 is formed of porcelain or other suitable insulating material and it has an internal chamber 21c of irregular shape surrounded by an annular wall 21d provided with vertically extending grooves 21e in its opposite sides. These grooves terminate at their upper ends in horizontal shoulders 21f which are engaged by transverse arms 17a formed in the lower ends of the rods 17, as shown in Fig. 2. A rubber washer 22 fits between the upper end of the tube 20 and the bottom wall 14f of the cap, being provided with apertures which are fitted by the rods 17 so that it is held against transverse displacement. A similar rubber washer 23 fits between the lower end of the tube 20 and the top wall 21b of the head 21, and is similarly apertured for engagement by the rods 17. With this arrangement of the parts, the tube 20 and the head 21 are clamped in fixed relation to the cap 14 by assembling these members in the manner described and then tightening the nuts 19 on the upper ends of the rods 17 to cause the arms 17a to exert an upward pressure and thereby compress the washers 22 and 23. After the nuts have been tightened the terminal posts 16 are threaded onto the upper ends of the rods to the final positions shown in Figs. 2 and 4.

Two plate electrodes 25 are welded or otherwise secured to the lower end portions of the rods 17 and are spaced apart in parallel vertical planes in the chamber 21c of the head 21. These electrodes are provided with apertures 25a to facilitate the escape of bubbles as the water between them is heated by the passage of current therethrough. The lower end of the chamber 21c is closed by a disc 26 formed of asbestos or other suitable insulating material which is secured to the bottom of the head 21 by bolts 27 which extend through apertures in the outer wall 21d of the head and project into recesses 21g in this wall where they are engaged by nuts 28. The water in the vessel 10 is adapted to seep into the chamber 21c between the plate or disk 26 and the lower end of the head and, if desired, one or more small apertures may be formed in the disk 26 to permit a freer access of water. Assuming that the terminal posts 16 are connected in an electric circuit, the current passing between the electrodes 25 vaporizes the water and the steam or vapor passes upwardly and escapes from the chamber 21c through the circular ports 21h which are formed in the top wall 21b of the head. The steam then passes upwardly, and through the body of water in the vessel 10 if the vessel is filled above the top of the head 21, with the result that the steam collects above the water and beneath the cap 14 and is discharged with substantial pressure through the port 14h where it entrains the vapor of the medicament in the receptacle 14g.

In Fig. 7 there is shown a modified form of vaporizing unit comprising a cap 30 which is in all respects similar to the cap 14 except that the wall 30f which bounds the cavity 30e in which the terminal posts 31 are located has a depending annular ring 30i against which the upper end of a vaporizing tube 32 abuts. This tube is formed of asbestos or other suitable insulating material and a flange 30j formed on the ring 30i fits loosely into its upper end to hold it in place. The lower end of the tube 32 is closed by a disk 33 of insulating material which fits into the end of the tube and has a flange 33a overlapping the end of the tube.

The terminal posts 31 have a threaded engagement with two rods 34 which extend downwardly through apertures in the bottom wall 30f of the cap into the tube. They converge slightly in a downward direction and their lower ends are welded or otherwise secured to the top edges of two spaced metal electrodes 35 which are spaced apart and which have their bottom edges seated in grooves formed in the top surface of the disk 33. An angle shaped metal clip 36 is welded or otherwise secured to the lower end of each electrode and the lower flanges of these clips are secured to studs 37 which extend through apertures in the disk 33 and are engaged on their lower ends by nuts 38. The disk 33 has an aperture 33b therein to permit water from the vessel to enter the chamber of the tube where it is vaporized by current passing therethrough between the electrodes 35. The steam or vapor produced in the tube is discharged through a port 30h in the tube above a receptacle 30g for a medicament.

It will be apparent that the present invention provides a novel vaporizing device in which a relatively small portion of the liquid in the supply vessel may be quickly vaporized in a vaporizing chamber without heating the entire body of liquid in the vessel. The device may be easily taken apart for cleaning and repair purposes and may be readily reassembled.

Although one form of the invention has been shown and described by way of illustration, together with a modification of a portion thereof, it will be understood that the invention may be embodied in various other forms which come within the scope of the appended claims.

We claim:

1. A vaporizer comprising a vessel formed of insulating material adapted to contain a body of water and having an open neck, a cap on said neck, a pair of terminal rods extending downwardly through a pair of spaced openings in said cap, the upper end portions of said rods protruding upwardly above said openings in position to be connected to a source of electricity and the lower end portions thereof extending downwardly well within the interior of said vessel, a hollow elongated tubular structure extending downwardly beneath said cap and encompassing said lower end portions of said rods, said tubular structure being supported directly upon said lower end portions of said rods and being adapted to receive water in its hollow interior from the surrounding interior of said vessel, electrodes secured to said lower end portions of said rods within said tubular structure to heat the water therein, and adjustable means on said upper end portions of said rods for drawing said rods upwardly with respect to said cap to raise said tubular structure and clamp the upper end thereof tightly against the underside of said cap.

2. A vaporizer comprising a vessel formed of insulating material adapted to contain a body of water and having an open neck, a cap on said neck, a pair of terminal rods extending downwardly through a pair of spaced openings in said cap, the upper end portions of said rods having threads formed thereon and protruding upwardly above said openings in position to be connected to a source of electricity and the lower end portions thereof extending downwardly well within the interior of said vessel, a hollow elongated tubular structure extending downwardly beneath said cap and encompassing said lower end portions of said rods, said tubular structure being supported directly upon said lower end portions of said rods and being adapted to receive water in its hollow interior from the surrounding interior of said vessel, electrodes secured to said lower end portions of said rods within said tubular structure to heat the water therein, and adjustable means engaging said threads on said upper end portions of said rods and bearing on the upper side of said cap for drawing said rods upwardly with respect to said cap thereby to raise said tubular structure and clamp the upper end thereof tightly against the underside of said cap.

3. The combination set forth in claim 2, including terminal posts received on said threads on said upper end portions of said rods above said adjustable means thereon.

4. A vaporizer comprising a vessel formed of insulating material adapted to contain a body of water and having an open neck, a cap on said neck, a pair of terminal rods extending downwardly through a pair of spaced openings in said cap, the upper end portions of said rods protruding upwardly above said openings in position to be connected to a source of electricity and the lower end portions thereof extending downwardly well within the interior of said vessel, a hollow vaporizing head supported directly upon and encompassing the lowermost end portions of said rods within said vessel, said head being adapted to receive water therein from the surrounding interior of said vessel, an upstanding tube supported at its lower end by said vaporizing head and encompassing the intermediate portion of said rods between said head and the underside of said cap, electrodes secured to said lowermost end portions of said rods within said vaporizing head to heat the water therein, and adjustable means on said upper end portions of said rods for drawing said rods and said vaporizing head upwardly with respect to said cap so as to clamp said tube tightly between said vaporizing head and the underside of said cap.

5. A vaporizer comprising a vessel formed of insulating material adapted to contain a body of water and having an open neck, a cap seated on said neck, terminal posts mounted in said cap, a tube engaging said cap, a vaporizing head engaging said tube, terminal rods secured to said posts and extending through said tube into said head, said rods having transversely extending arms within said head, said head having transverse shoulders engaged by said arms, means for adjusting said rods to clamp said tube and said head to said cap, and electrodes connected to said rods within said head.

6. A vaporizer comprising a vessel formed of insulating material and adapted to contain a quantity of water, means in said vessel for vaporizing said water, a cap carried by said vessel for permitting the escape of steam from said vessel, and a metal shell fitting over the lower part of said vessel and adapted to rest on a support, said shell having an outwardly flared upper edge and having legs spacing its bottom from said support.

References Cited in the file of this patent
UNITED STATES PATENTS

| | | |
|---|---|---|
| 1,625,034 | Lawner | Apr. 19, 1927 |
| 1,981,765 | Weiss | Nov. 20, 1934 |
| 2,387,156 | Katzman | Oct. 16, 1945 |
| 2,713,628 | Barkin | July 19, 1955 |